United States Patent

Ewert et al.

[11] 3,841,657
[45] Oct. 15, 1974

[54] VEHICLE OCCUPANT-RESTRAINT ARRANGEMENTS

[75] Inventors: Bruno Ewert; Gunter Stein, both of Russelsheim/Main, Germany

[73] Assignee: General Motors Corporation, Detroit, Mich.

[22] Filed: Feb. 9, 1973

[21] Appl. No.: 331,056

[30] Foreign Application Priority Data
Feb. 15, 1972 Germany............................ 2207091

[52] U.S. Cl. ....... 280/150 SB, 280/150 B, 297/388, 297/389, 297/390
[51] Int. Cl............................................ A62b 35/00
[58] Field of Search ..... 280/150 SB, 150 B; 180/82, 180/82 C; 297/388, 389, 390, 385

[56] References Cited
UNITED STATES PATENTS
| | | | |
|---|---|---|---|
| 2,668,583 | 2/1954 | Singer | 297/390 X |
| 3,640,572 | 2/1972 | Doehler | 280/150 B X |
| 3,764,159 | 10/1973 | Grime | 280/150 B |

*Primary Examiner*—David Schonberg
*Assistant Examiner*—Michael Forman
*Attorney, Agent, or Firm*—Herbert Furman

[57] ABSTRACT

An occupant-restraint arrangement comprising a support means secured to the floor of a motor vehicle adjacent a side of a seat, preferably the inboard side; a curved occupant-restraint member pivotally mounted at one end to the support means so as to be movable about a pivot axis substantially parallel with the longitudinal axis of the vehicle between an occupant-restraint position, in which the free end of the member serves as a lap restraint for an occupant of the seat, and a non-restraint position; a flexible shoulder belt attached at one end to the free end of the curved member and at the other end to said support means so as to serve as a shoulder restraint for the occupant when the curved member is in the occupant-restraint position; and a locking device on the support means adapted to lock the curved member against pivotal movement from its occupant-restraint position when deceleration forces exerted on the vehicle exceed a predetermined value within a predetermined time. The curved member is preferably a rigid padded member shaped at its free end to conform with the shape of the occupant's body.

11 Claims, 7 Drawing Figures

VEHICLE OCCUPANT-RESTRAINT ARRANGEMENTS

The invention relates to an occupant-restraint arrangement for vehicles, particularly motor vehicles.

The aim of the present invention is to design a belt system which can be operated directly by one movement of the hand (or indirectly by button pressure or actuation of the door) but nevertheless is simple in construction, robust and functionally reliable, and also which saves expense and space.

According to the invention an occupant-restraint arrangement is provided in which a curved or bow member, shaped to correspond with the particular bodily areas of the vehicle occupant, forms a lap restraint for the occupant the bow member being articulated lateral of the seat, and pivotable about an axis substantially parallel with the longitudinal axis of the vehicle. Attached to the free end of the bow member is the free end of an oblique shoulder belt. The swivelling action of the bow member can be motor-operated in dependence upon the door movement, or by hand. A locking device engages the bow member in its occupantrestraint position and locks it against pivotal movement when, and only when, the vehicle occupant is thrown forward during an impact. By means of this measure it is possible for the vehicle occupant immediately at any time, i.e. without previously releasing a locking device, to swivel the bow member upwards and in this way release the occupant-restraint arrangement that has already been applied, whether during travel or when the vehicle is stationary.

A preferable feature of the present invention is that the pivotal axis of the bow member is arranged at the seat-side remote from the door. This affords a non-obstructed entry and exit to the vehicle seat for the occupant.

Preferably, the catch device is operated by the oblique shoulder strap tightening itself when the vehicle occupant is thrown forward with a jerk. In this respect it is proposed that the oblique shoulder belt — proceeding from its free end secured to the bow member — passes through a deflecting device arranged above the back-rest and is led downwards from this device to a second deflecting device from which it runs forward to a third deflecting device and from here back again to its fixed point on the transmission tunnel, and that the third deflecting device is arranged on a lever movable against spring effort and directly actuating the locking device for the bow member. The deflecting devices may consist of deflecting rollers which allow an almost frictionless deflection of the belt.

In order to allow the oblique shoulder belt to comfortably adapt to the body contours of the vehicle occupant without too much restriction or without too much slackness, it is advantageous if the bottom end of the oblique shoulder belt passes into an automatic winding device arranged on the transmission tunnel.

The practical realisation of the articulated arrangement of the bow member in accordance with the invention can be usefully achieved if the bow member is rotatably mounted by means of a bent arm in a tube running at the side of the seat and parallel thereto.

In the preferred embodiment of the invention, the locking device includes a lever carrying the third deflecting device of the oblique shoulder belt swivellably mounted in a bearing eye welded to the tube and that, in proximity to its articulation point, the lever is provided with a projection near to which the tube as well as the bent arm each have a cavity therein, wherein the correspondingly shaped projection is able to engage during a swivelling movement of the lever.

To serve to limit the movement of the lever the bearing eye is provided with two stops at the opposite side of the bearing of the lever. In order to clearly define the end positions of the bow member, the swivelling movement of the bent arm may be limited by providing at its free end a cam which is located in a cavity of the tube and rests against stops in the end positions. To make sure that the bow member reaches its end positions, the bow member is biased towards its end positions by the action of a dead centre spring arrangement on the extremity of the bent arm.

In order to indicate to the vehicle occupant when the belt system is applied that the bow member is located in its end position corresponding to the occupant-restraint position a curved leaf spring is secured by one end to the tube and has its other end bent slightly inwards, to pass through a slot in the tube so as to rest against the arm, a depression in the arm being arranged in such a way that, when the restraint arrangement is applied, the depression coincides with the slot in the tube. In this way a clearly discernable snapping-in sound is generated as the occupant-restraint position is achieved.

The effect of a seat adjustment in the longitudinal direction of the vehicle can be compensated for in that the tube forming the bearing for the bow member is secured to the end of a swivelling arm which is mounted on the vehicle floor pivotable about an axis transverse to the longitudinal direction of the vehicle, the swivelling arm being held in a rearward position by a spring. This springy swivel-feature of the entire system in the longitudinal direction of the vehicle also makes possible an individual adaptation of the occupant-restraint system to various body thicknesses and allows a degree of movability for the vehicle occupants.

These and other features, advantages and objects of the invention will become more apparent from the following detailed description and drawings, in which.

Figure 1:
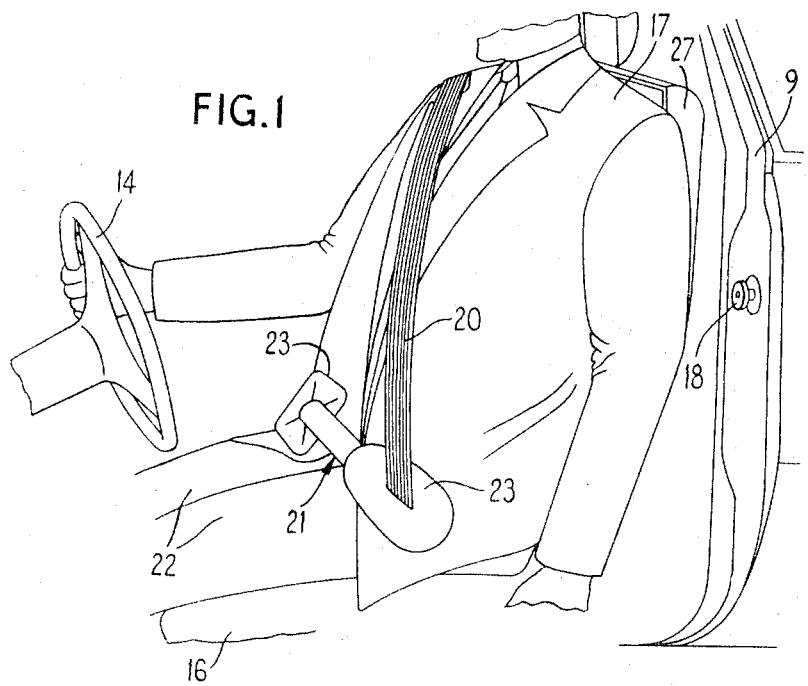
FIG. 1 shows part of the interior of a car, with a seat-belt system in accordance with the invention, in perspective, applied to a driver seated in a driving seat of the car.
Figure 2:
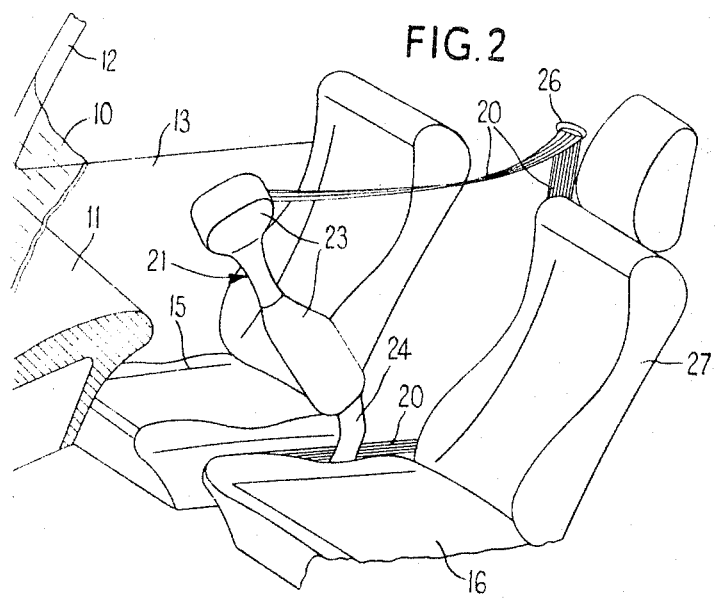
FIG. 2 shows a view similar to FIG. 1, but with the seat-belt system detached and without the driver.
Figure 7:
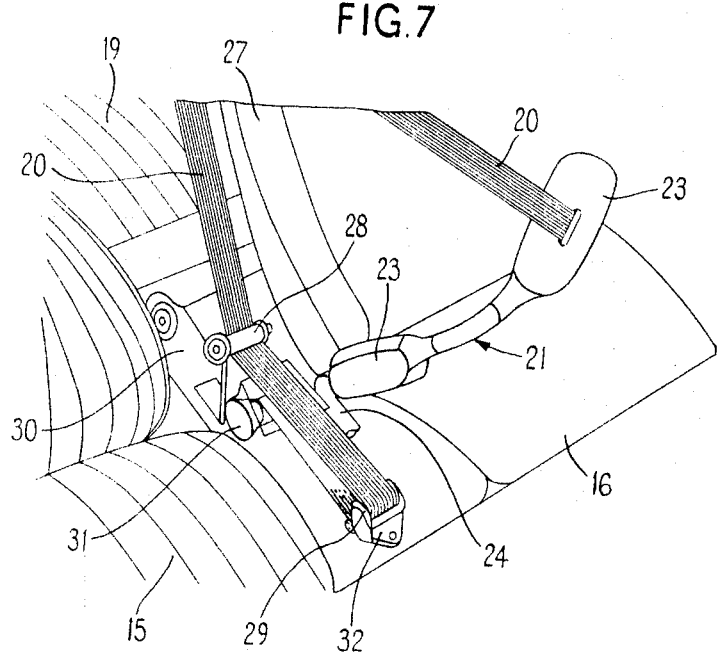
FIG. 7 shows a partial perspective view of the right-hand side of the driver's seat shown in FIG. 3, with the seat-belt system in a detached position and with a section of the mechanism removed for clarity.

In FIGS. 1 and 2, 10 denotes the windscreen, 11 the dashboard, 12 the right front side roof-support member (A-post), 13 the right front door, 14 the steering wheel, 15 the front passenger seat and 16 the driver's seat of a car. A driver when seated in the seat 16 in FIG. 1 is denoted by 17. In addition, a door latch striker 18 on the door post 9 can be seen in FIG. 1. A part 19 of the rear vehicle seat can be seen in FIG. 7.

A safety belt system applied to the driver 17 in FIG. 1 consists of an oblique shoulder belt 20 and a curved or bow member 21 which is articulated at the side of the seat 16 and forms a "pelvic belt" for the driver 17. The free end of shoulder belt 20 is fastened to the free end of the bow member 21. The bow member 21 is appropriately shaped to suit the contours of the vehicle occupant 17 and has hard foam pads 23 covered with leather, artificial leather or the like, which are placed in the lap and which allow an adaptation to the individual body width. The point of articulation of the bow member 21 is on the side of the driver's seat adjacent the front passenger seat 15, so that when the bow member 21 (FIGS. 2 and 7) is swivelled upwards away from the driver's body, the driver can freely get in and out of the car. The point of support of the bow member 21 can be seen particularly in FIGS. 3, 4 and 6, and consists of a bent arm 24 forming a structural part with the bow member 21 and movably mounted in a tube 25 located parallel with the seat 16. The bow member 21 is therefore swivellable about an axis parallel to the longitudinal axis of the vehicle.

As can be seen, the shoulder belt 20 extends from the bow member 21 through a deflecting roller device 26 above a back-rest 27 of the seat 16 and then extends vertically downwards towards the floor of the car. The belt then extends forwardly under the second deflecting roller 28 (FIG. 7), over a third deflecting roller 29 and then back again to pass into an automatic belt-retraction device 31 mounted on the transmission tunnel 30 of the car. As can be particularly seen in FIGS. 4, 5 and 6 the deflecting roller 29 is mounted on a lever 33 by means of a bracket 32, the lever swivelling on a bearing eye 34 welded to the tube 25. The upper part of the bearing eye 34 extends transversely to the tube 25, and has two stops 36, 37 on the opposite side of the bearing 35 of the lever 33. The stops 36, 37 limit the lateral movement of the lever 33, which in a side view (taken in the direction of arrow C in FIG. 4) has the shape shown in FIG. 5.

Figure 3:
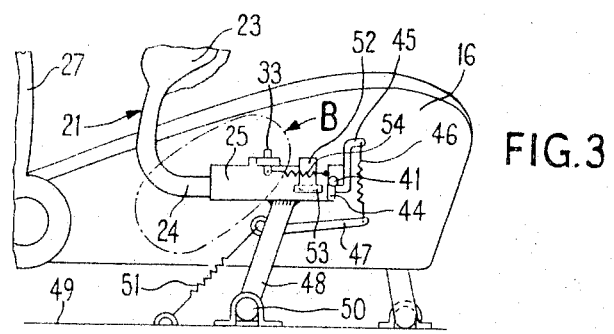
FIG. 3 shows a partial side view of the right-hand side driver's seat shown in FIGS. 1 and 2, illustrating part of the seat-belt operating mechanism.
Figure 4:
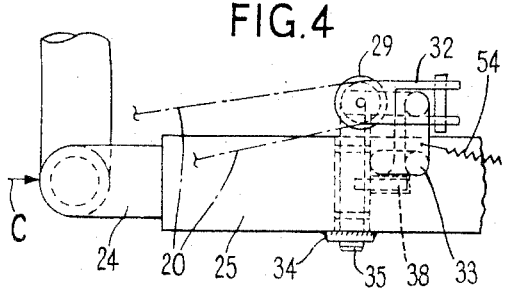
FIG. 4 shows detail B in FIG. 3, enlarged, plus a further part of the mechanism.
Figure 5:
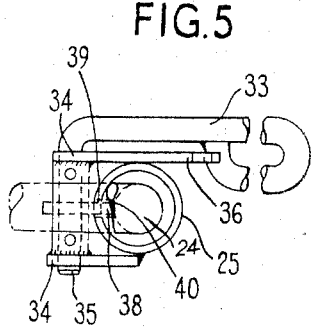
FIG. 5 shows a view in the direction of arrow C in FIG. 4.
Figure 6:
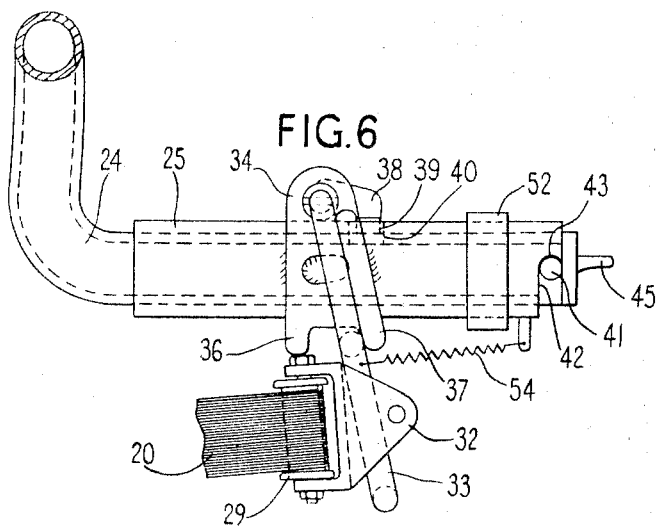
FIG. 6 shows a top view of the representation in FIG. 4.

As can be seen in FIGS. 5 and 6, a catch 38 is firmly mounted on the lever 33, in the vicinity of which catch both the tube 25 and the arm 24 has a cavity 39 or 40 in which the correspondingly-shaped catch 38 can engage when the lever 33 swivels, so that both tubes are locked against each other against rotation. To limit the rotational movement of the bent arm 24 the latter has a cam 41 on its free end, which is located in a cavity 42 in the tube 25 and rests against stops 43 (FIG. 6) or 44 (FIG. 3) in the end positions of swivellable travel for the arm 24. On said free end of the bent arm 24 is located a suspension member 45 for a dead centre spring 46, whose other end engages with a rod 47 (FIG. 3). As FIG. 3 also shows, the rod 47 is secured to a swivel leg 48, which at one end is articulated to the vehicle floor 49 by means of a bearing 50, and at the other end is welded to the tube 25. The swivel leg 48 is maintained in the position shown in FIG. 3 by the force of a tension spring 51 attached to the swivel leg 48 and to the floor 49. One end of a curved leaf spring 52 is also fastened to the tube 25, whilst the other end, which is bent inwards slightly towards the tube, passes through a slot 53 in the tube 25 and rests against the bent arm 24. A recess in the arm 24 is located in such a way that it coincides with the slot 53 in the tube 25 when the belt system 20, 21 is applied, so that the spring 52 engages in the arm 24 in the restraint position of the bow member 21. A spring 52 secured to the tube 25 and the lever arm 33 holds the lever arm 33 in the position shown in FIG. 6.

The principle of operation of the seat-belt system is as follows: with the bow member 21 in the non-restraint position shown in FIG. 2 the driver can easily place himself on the driver's seat 16. He then passes his hand below the belt 20 and pulls the bow member 21 downwards and towards his body so that the bow member 21 rests around his hips. The snapping-in noise generated by the spring 52 locating in the aforesaid recess in the bent arm 24 of the bow member 21 tells the driver that the bow member 21 is in the proper occupant-restraint position. The bow member 21 is — as already explained and illustrated in FIGS. 1, 2 and 7 — padded and can be brought if desired into the engaged position around the driver 17 automatically by the operation of a motor (not shown). During the driver-engaging movement of the bow member 21 the oblique shoulder belt 20 is tightened about the driver, the requisite length of the belt 20 being effected by means of the unwinding of the retraction device 31. In the engaged position of the bow member 21 the spring 54 retains the lever 33 and thus the deflecting roller 29 in the position shown in FIG. 6, the spring 54 being stronger than the retractile spring in the belt retraction device 31. Because the position of the tube 25 relative to the floor 49 can be adjusted by means of movement of the swivelling leg 48 any alteration of the setting of the seat 16 along the longitudinal axis of the car can be compensated somewhat. Above all the adjustability of the position of this leg 48 against the bias of spring 51 allows an adaptation of the position of bow member 21 to the individual body thickness of the driver, and also allows a restricted degree of freedom of movement to the driver. In the forward adjusted position of the seat 16 the bow member 21 would be applied to the driver in a somewhat higher position on his body than would be the case if the seat 16 were located in its rearward adjusted position, in which position the bow member 21 would press more against the thighs. The end position of the bow member 21 in the occupant-restraint position is finally limited by the stop 43 for the cam 41. The dead centre spring 46 also assists in reaching this end position safely and smoothly, since it acts to bias the bow member into either the occupant-restraint position or the non-restraint position.

If the driver is thrown forwards in the seat due to a collision the oblique shoulder belt 20 is rapidly tensioned and becomes locked in the belt winding device 31. At the same time the lever 33 carrying the roller 29 is moved rearwards relative to the seat 16, so that the catch 38 engages in the recesses 39 and 40. The snap-in spring 52 is already preventing any tendency for the arm 24 to rotate inside the guide tube 25. Once the catch 38 is engaged, both the arm 24 and the bow member 21 are locked against rotation and the bow member 21 remains secured about the lower part of the driver's body.

If the driver wishes to get out of the vehicle, all he has to do is to swing up the bow member 21. In the swung-up position, the movement of the bow member 21 is limited by the stop 44 in the tube 25. 45 and the dead centre spring 46 holds the bow member 21 in this swung-up position. The locking action of the catch 38 only lasts for as long as the driver's body is tensioning the belt during periods of acute deceleration.

It would be advantageous to arrange the mechanical devices of the belt system and the lower horizontally extending portions of the belt underneath the seat instead of adjacent the seat, which arrangement from a design standpoint could readily be achieved. It would also be possible to mount the tube 25 and perhaps also the belt winder 31 directly on to the seat if so desired.

The bow member 21 or its inner core may be designed in such a way that at least partially, i.e. at certain points, it is made to plastically deform in the event of a collision, for the purpose of converting kinetic energy possessed by the driver into work of deformation to thus absorb this kinetic energy. Although the specific description of the seat belt system has only been described with respect to a system for the driver of a car, an exactly similar system would be utilised for the front passenger seat of the car for use by a passenger occupying that seat.

We claim:

1. In a motor vehicle having a floor and a vehicle seat secured to said vehicle floor, an occupant-restraint arrangement comprising a support means secured to said floor adjacent an inboard side of said seat, a curved occupant-restraint member having a free end and an end pivotally mounted to said support means about a pivot axis substantially parallel with the longitudinal axis of the vehicle, said member being movable about said pivot axis between an occupant-restraint position, in which the free end of the member serves as a lap restraint for an occupant of the seat, and a non-restraint position; a flexible shoulder belt having one end attached to the free end of the curved member and having another end attached to an anchorage so that the belt is adapted to serve as a shoulder restraint for said occupant when the curved member is in the occupant-restraint position; and a locking device for locking the curved member against pivotal movement from its occupant-restraint position in response to shoulder belt tension caused by forward movement of the occupant as the rate of vehicle movement changes abruptly.

2. In a motor vehicle having a floor and a vehicle seat secured to said vehicle floor, an occupant-restraint arrangement comprising a support means secured to said floor adjacent an inboard side of said seat; a rigid occupant-restraint member having a free end and an end pivotally mounted to said support means about a pivot axis substantially parallel with the longitudinal axis of the vehicle, said member being shaped to fit an occupant's body and being movable about said pivot axis between an occupantrestraint position, in which the free end of the member serves as a lap restraint for an occupant of the seat, and a non-restraint position; a lever pivoted upon the support means; spring means biasing the lever into a predetermined position relative to the support means; a flexible shoulder belt having an end attached to the free end of the rigid member and having another end passing over said lever and secured to a portion of the vehicle, the shoulder belt being adapted to serve as a shoulder restraint for said occupant when the rigid member is in the occupantrestraint position and to move the lever against the bias of the spring means as the belt is tensioned by forward movement of the occupant; and a locking device on the lever which moves into a locking position as the lever is moved by the belt tension so as to lock the rigid member against pivotal movement from its occupant-restraint position.

3. A motor vehicle having a floor and a seat secured to said floor, and having an occupant-restraint arrangement comprising the following combination, a support means secured to said floor adjacent an inboard side of said seat; a curved occupant-restraint member having a free end and an end pivotally mounted to said support means about a pivot axis substantially parallel with the longitudinal axis of the vehicle, said member being movable about said pivot axis between an occupant-restraint position, in which the free end of the member serves as a lap restraint for an occupant of the seat, and a non-restraint position; a lever pivoted upon the support means; spring means biasing the lever into a predetermined position relative to the support means; roller means carried by the lever; a flexible shoulder belt having one end attached to the free end of the curved member and having another end attached to said vehicle floor, which shoulder belt passes around the roller means and is adapted to serve as a shoulder restraint for said occupant when the curved member is in the occupant-restraint position; and a locking device on the support means connected to said lever so that when the force exerted on the roller means by tension in the flexible shoulder belt exceeds the force exerted by the spring means, the lever pivots into a position in which the locking device locks the curved member against pivotal movement from its occupant-restraint position.

4. An occupant-restraint arrangement according to claim 3, in which two stops are provided upon the support means, one of the stops determining the predetermined position of the lever and the other stop determining the position of the lever in which the locking device locks the curved member against pivotal movement from its occupant-restraint position.

5. An occupant-restraint arrangement according to claim 3, in which the pivoted end of the curved occupant-restraint member is a bent arm, the support means includes a tube extending substantially parallel with the longitudinal axis of the vehicle, and the bent arm is pivotally mounted in the tube.

6. An occupant-restraint arrangement according to claim 5, in which the bent arm has a cavity, the tube has a cavity, said cavities coinciding with one another when the curved occupant-restraint member is in its occupant-restraint position, and the locking device comprises a bolt on the lever which is inserted in these cavities to lock the curved member against pivotal movement from its occupant-restraint position.

7. An occupant-restraint arrangement according to claim 5, in which there is a cam on the bent arm and the side of the tube has a cavity therein with ends that provide stops, the cam being movably located within the cavity and co-operating with the stops at the ends of the cavity to limit the pivotal movement of the bent arm in the tube.

8. In a motor vehicle having a floor and a vehicle seat secured to said vehicle floor, an occupant-restraint arrangement comprising: a support means secured to said floor adjacent an inboard side of said seat and including a tube extending substantially parallel with the longitudinal axis of the vehicle; a curved occupant-restraint member having a free end and a bent arm portion pivotally mounted in the tube of said support means, said member being movable about the pivot axis of the bent arm portion between an occupant-restraint position, in which the free end of the member serves as a lap restraint for an occupant of the seat, and a non-restraint position; an over-centre spring arrangement attached to the bent arm portion, which spring arrangement serves to bias the curved occupant-restraint member into either the occupant-restraint position or the non-restraint position; a lever pivoted upon the support means; spring means biasing the lever into a predetermined position relative to the support means; roller means carried by the lever; a flexible shoulder belt having an end attached to the free end of the curved member and another end attached to said vehicle floor, which shoulder belt passes around the roller means and is adapted to serve as a shoulder restraint for said occupant when the curved member is in the occupant restraint position; and a locking device for selectively locking the curved member in its occupant-restraint position, the locking device being mounted on the support means and being connected to said lever so that when the force exerted on the roller means by tension in the flexible shoulder belt exceeds the force exerted by the spring means, the lever pivots into a position in which the locking device locks the curved member against pivotal movement from its occupant-restraint position.

9. An occupant-restraint arrangement according to claim 8, in which the tube has a longitudinally-extending slot therein, the bent arm portion has a longitudinally-extending recess therein, which recess coincides with the slot in the tube when the curved member is in its occupant-restraining position, and a curved leaf spring has one end secured to the tube and has another end received by the slot in the tube so as to resiliently press upon the bent arm portion within the recess thereof to normally position the curved member in the occupant-restraint position.

10. In a motor vehicle having a floor and a vehicle seat secured to said vehicle floor, an occupantrestraint arrangement comprising: a support means adjacent an inboard side of said seat and comprising a tube extending substantially parallel with the longitudinal axis of the vehicle and a leg connected at one end to the tube and pivoted at the other end to the floor about an axis extending transversely to the longitudinal axis of the vehicle; a curved occupant-restraint member having a free end and a bent arm portion pivotally mounted in the tube of said support means, said member being movable about the pivot axis of the bent arm portion between an occupant-restraint position, in which the free end of the member serves as a lap restraint for an occupant of the seat, and a non-restraint position; an over-centre spring arrangement attached to the bent arm portion, which spring arrangement serves to bias the curved occupant-restraint member into either the occupant-restraint position or the non-restraint position; a lever pivoted upon the support means; spring means biasing the lever into a predetermined position relative to the support means; roller means carried by the lever; a flexible shoulder belt having one end attached to the free end of the curved member and having another end attached to said vehicle floor, which shoulder belt passes around the roller means and is adapted to serve as a shoulder restraint for said occupant when the curved member is in the occupant-restraint position; and a locking device for selectively locking the curved member in its occupant-restraint position, the locking device being mounted on the support means and being connected to said lever so that when the force exerted on the roller means by tension in the flexible shoulder belt exceeds the force exerted by the spring means, the lever pivots into a position in which the locking device locks the curved member against pivotal movement from its occupant-restraint position.

11. An occupant-restraint arrangement according to claim 10, in which a spring connected between the floor and the leg adjacent the tube biases the support means against movement towards the front of the seat.

* * * * *